United States Patent [19]
Brunner et al.

[11] 3,757,185

[45] Sept. 4, 1973

[54] BRUSHLESS DC MOTOR HAVING A PERMANENT MAGNET ROTOR AND A STATOR WINDING COMPRISING A PLURALITY OF COMPONENT WINDINGS

[75] Inventors: Julius Brunner, Nurnberg; Hans Kuhnlein, Grossgrundlach, both of Germany

[73] Assignee: Siemens Aktiengesellschaft, Berlin & Munich, Germany

[22] Filed: Dec. 2, 1971

[21] Appl. No.: 204,187

[30] Foreign Application Priority Data
Dec. 5, 1970 Germany................ P 20 59 884.9

[52] U.S. Cl.................. 318/254, 318/345, 318/138
[51] Int. Cl. .......................................... H02k 29/00
[58] Field of Search................... 318/138, 254, 439, 318/345

[56] References Cited
UNITED STATES PATENTS

| 3,541,408 | 11/1970 | Schwendtner | 318/254 |
| 3,483,456 | 12/1969 | Brunner et al. | 318/254 X |
| 3,486,099 | 12/1969 | Brunner et al. | 318/254 |
| 3,667,019 | 5/1972 | Elliott | 318/254 |
| 3,663,878 | 5/1972 | Migasaka et al. | 318/138 |
| 3,448,359 | 6/1969 | Engel | 318/138 X |
| 3,652,909 | 3/1972 | Rainer | 318/138 |
| 3,651,368 | 3/1972 | Hanada | 318/254 |

*Primary Examiner*—G. R. Simmons
*Attorney*—Arthur E. Wilfond et al.

[57] ABSTRACT

A brushless DC motor comprises continuously adjustable control means for controlling a plurality of power transistors in dependence upon the position of a permanent magnet rotor. The control means comprises a control member having an output coupled to the power transistors and a control input. Current regulating circuit has an actual value derived from a current-proportional voltage derived from a common emitter resistor of the power transistors and a datum value determined from outside the current regulating circuit.

8 Claims, 1 Drawing Figure

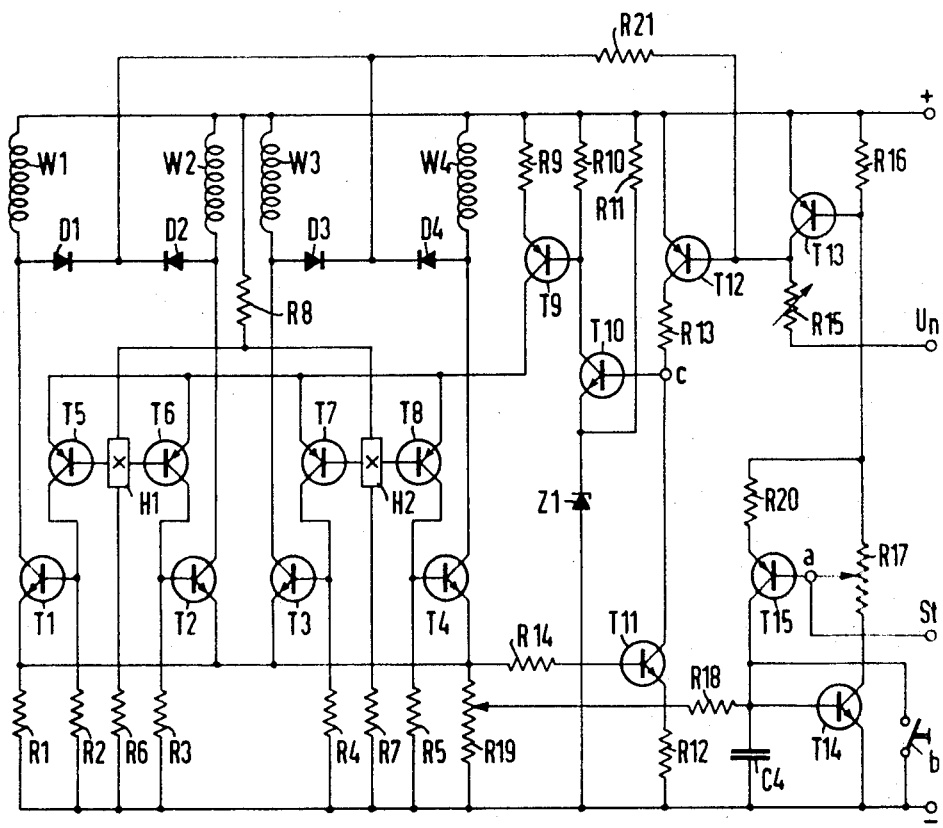

BRUSHLESS DC MOTOR HAVING A PERMANENT MAGNET ROTOR AND A STATOR WINDING COMPRISING A PLURALITY OF COMPONENT WINDINGS

The invention relates to a brushless DC motor.

The brushless DC motor of the invention comprises a permanent magnet rotor and a stator winding having a plurality of component windings. One end of each of the component windings is in a star connection with the others and said ends are connected to a first terminal of a DC voltage source. The other end of each of the component windings is connected in series to a corresponding power transistor. The emitter electrodes of all the power transistors are connected via a common emitter resistor to the second terminal of the DC voltage source. The power transistors are controlled in dependence upon the position of the permanent magnet rotor, via a control member which can be continually adjusted.

The aforedescribed type of motor is disclosed in the Siemens Zietschrift, 44th annual publication, Apr., 1970, pages 255 to 257, FIG. 4. Because the current amplifications vary in the power transistors, there is a danger of overloading individual component windings. There is a particular danger of overloading during the starting process, since the starting current amounts to a multiple of the rated current and the component windings are sometimes passed by the load current for relatively long periods, due to the rotation of the motor rotor, which first begins at that time. To make such a motor useful for intermittent operation, its component windings must be rated or designed for loads which occur during intermittent operation.

An object of the invention is to provide a brushless DC motor of the aforedescribed type whose load current is almost uniform in all the component windings, despite the variable current amplification of the individual power transistors.

Another object of the invention is to provide a brushless DC motor having a substantially uniform load current in all its component windings and which functions with efficiency, effectiveness and reliability.

In accordance with the invention, the control input of the control member is connected to the output of a current regulating circuit. The actual value of the current regulating circuit is derived from a current-proportional voltage tapped at a common emitter resistor and whose datum value is determined from the outside or derived from an operational magnitude.

A simple control of the rotary speed of the motor or the motor rpm is possible by making the datum value of the current regulating circuit dependent upon the speed. It may also be preferable to limit the datum value of the regulating circuit to a maximum value. The protection of the motor may be further improved by disconnecting the datum value of the regulating circuit when the maximum value lasts too long.

A particularly simple current regulating circuit of another embodiment of the invention comprises a first regulating transistor having its collector electrode connected to the base electrode of a control transistor which functions as a control member. The collector electrode of the first regulating transistor is also connected via a first collector resistor to a first terminal of a DC voltage source and its emitter electrode is connected to a common junction point of a Zener diode and a series resistor which are connected to the DC voltage source.

The control transistor has a base electrode directly connected to the collector electrode of a second regulating transistor which is connected via a base resistor to a common emitter resistor and via a first emitter resistor to the second terminal of the DC voltage source. The base electrode of the control transistor is also connected via a second collector resistor to the collector electrode of a third regulating transistor controlled in proportion to the rpm. The third regulating transistor has an emitter electrode connected to the first terminal of the DC voltage source.

In accordance with another feature of the invention, when the maximum current prevails for too long, the current is switched off, so that the emitter-base path of the third regulating transistor is connected in parallel with the emitter-collector path of a switching transistor. The base electrode of the switching transistor is connected via a terminal resistor to the first terminal and via the collector resistor and the collector-emitter path of a delay transistor to the second terminal of the DC voltage source. The delay transistor is connected in a self-holding circuit. The base electrode of the delay transistor is connected via another base resistor to the tap of a voltage divider connected in parallel with the common emitter resistor, and to the second terminal of the DC voltage source, via a delay capacitor.

The self-holding of the delay transistor may be provided in a simple manner by connecting into the circuit a self-holding transistor which complements the delay transistor. The base electrode of the self-holding transistor is connected to a tap of the collector resistor of the delay transistor.

In an emergency, it is also possible to disconnect the DC motor of the invention by a control command issued from the outside, if a control terminal which is operated from the outside and is connected to the tap of the collector resistor is provided.

In order that the invention may be readily carried into effect, it will now be described with reference to the accompanying drawing, wherein the single FIGURE is a circuit diagram of an embodiment of the brushless DC motor of the invention.

In the FIGURE, the brushless DC motor of the invention has four component windings W1, W2, W3 and W4. One end of each of the windings W1 to W4 is in star connection with the others and is connected to the positive terminal + of a DC voltage source. The positive terminal + of the DC voltage source is hereinafter referred to as the first terminal. The other end of each of the windings W1 to W4 is connected in series with a corresponding one of a plurality of power transistors T1, T2, T3 and T4.

Thus, the other end of the winding W1 is connected to the collector electrode of the power transistor T1. The other end of the winding W2 is connected to the collector electrode of the power transistor T2. The other end of the winding W3 is connected to the collector electrode of the power transistor T3. The other end of the winding W4 is connected to the collector electrode of the power transistor T4.

The emitter electrodes of the power transistors T1 to T4 are connected to each other and are connected via a common emitter resistor R1, to the negative terminal — of the DC voltage source hereinafter referred to as the second terminal. The power transistors T1 to T4 are controlled via input transistors T5, T6, T7 and T8. To accomplish this, two input transistors T5, T6 and T7, T8 are connected to each of a pair of Hall generators H1 and H2. Thus, the base electrode of each of the input transistors T5 and T6 is connected to a corresponding one of the Hall electrodes of the Hall generator H1. The base electrode of each of the input transistors T7 and T8 is connected to a corresponding one of the Hall electrodes of the Hall generator H2.

The control electrodes of the Hall generators H1 and H2 are connected to the negative terminal — of the DC voltage source via resistors R6 and R7, respectively, and are connected via a common resistor R8, to the positive terminal + of the DC voltage source. The input transistors T5 to T8 are controlled via the Hall generators H1 and H2 in dependence upon the position of the permanent magnet rotor. The collector electrodes of the input transistors T5 to T8 are directly connected to the base electrodes of the power transistors T1 to T4, respectively, and are connected through collector resistors R2 to R5, respectively, to the negative terminal of the DC voltage source. The emitter electrodes of said input transistors T5 to T8 are connected to each other and to the positive terminal + of the DC voltage source via a control transistor T9, which functions as a control member, and via a control resistor R9.

A first regulating transistor T10 controls or regulates the current. The collector electrode of the first regulating transmitter T10 is directly connected to the base electrode of the control transistor T9 and is connected to the positive terminal + of the DC voltage source via a first collector resistor R10. The emitter electrode of the first regulating transistor T10 is connected to a common junction point of a Zener diode Z1 and a resistor R11. The Zener diode Z1 is connected in series with the resistor R11 between the terminals of the DC voltage source. The base electrode of the first regulating transistor T10 is connected, via a junction point $c$, directly to the collector electrode of a second regulating transistor T11 and via a second collector resistor R13 to the collector electrode of a third regulating transistor T12.

The emitter electrode of the second regulating transistor T11 is connected via a first emitter resistor R12 to the negative terminal — of the DC voltage source. The base electrode of the second regulating transistor T11 is connected via a base resistor R14 to a common junction point of the common emitter resistor R1 and the emitter electrodes of the power transistors T1 to T4. The emitter electrode of the third regulating transistor T12 is directly connected to the positive terminal + of the DC voltage source and its base electrode is connected to one end of an adjustable or variable datum value resistor R15 which is connected to a datum value voltage terminal $U_n$. The base electrode of the third regulating transistor T12 is also connected via a resistor R21 and four decoupling diodes D1, D2, D3 and D4 to the ends of the component windings W1 to W4 that are connected to power transistors T1 to T4.

Thus, the base electrode of the third regulating transistor T12 is connected to a common point in the connection of the component winding W1 and the power transistor T1 via the resistor R21 and the decoupling diode D1. The base electrode of the third regulating transistor T12 is connected to a common point in the connection of the component winding W2 and the power transistor T2 via the resistor R21 and the decoupling diode D2. The base electrode of the third regulating transistor T12 is connected to a common point in the connection between the component winding W3 and the power transistor T3 via the resistor R21 and the decoupling diode D3. The base electrode of the third regulating transistor T12 is connected to a common point in the connection between the component winding W4 and the power transistor T4 via the resistor R21 and the decoupling diode 4.

The emitter-base path of the third regulating transistor T12 is connected in parallel with the emitter-collector path of a switching transistor T13. The base electrode of the transistor T13 is connected via a terminal resistor R16 to the positive terminal + of the DC voltage source and is also connected to the collector electrode of a delay transistor T14 via a collector resistor R17. The emitter electrode of the delay transistor T14 is directly connected to the negative terminal — of the DC voltage source and its base electrode is connected to said negative terminal via a delay capacitor C4.

The base electrode of the delay transistor T14 is also connected via another base resistor R18 to the tap of a voltage divider R19. The voltage divider R19 is connected in parallel with the common emitter resistor R1. The base electrode of the delay transistor T14 is also directly connected to the collector electrode of a self-holding transistor T15. The emitter electrode of the self-holding transistor T15 is connected via a second emitter resistor R20 to the base electrode of the switching transistor T13. The base electrode of the self-holding transistor T15 is conductively connected to a tap $a$ of the collector resistor R17 of the delay transistor T14 and to a control terminal St, operated from the outside. For resetting the delay transistor T14 and the self-holding transistor T15, a resetting key $b$ is connected in parallel with the emitter-base path of said delay transistor.

The Hall generators H1 and H2 control the input transistors T5 to T8, and thus control the power transistors T1 to T4, in accordance with the position of the permanent magnet rotor, so that the component windings W1 to W4 have voltage applied thereto in a specific sequence, one following the other. The control transistor T9 controls the current in the emitters of the input transistors T5 to T8 and thus controls the load current of the power transistors T1 to T4.

At the beginning of the start-up process, the third regulating transistor T12 is fully controlled by the datum value voltage $U_n$, due to the absence of the speed proportional electromotive force. The collector current of the third regulating transistor T12 is determined by the potential difference between the positive terminal + of the DC voltage source and the junction point $c$ and the resistance value of the second collector resistor R13. The resistance value of the second collector resistor R13 limits the collector current of the third regulating transistor T12 and thus limits the datum value to a maximum value. A portion of the collector current flows across the collector-emitter path of the second regulating transistor T11, which is controlled in dependence upon the actual value, and across the first emitter resistor R12, to the negative terminal — of the DC voltage source.

The difference current between the collector current of the third regulating transistor T12 and the current which flows across the collector-emitter path of the second regulating transistor T11 controls the first regulating transistor T10. The collector current of the first regulating transistor T10 in turn controls the control transistor T9, so that the input transistor, which at this time is controlled by one of the Hall generators H1 and H2, and the power transistor connected to said input transistor are at fully advanced control. As soon as one of the power transistors T1 to T4 is at fully advanced control, a load current flows in the component winding W1 to W4 connected to said one of said power transistors and the permanent magnet rotor of the DC motor begins to rotate.

Due to the usually variable amplification of the individual input transistors T5 to T8 and the power transistors T1 to T4, variable load currents occur in the individual component windings W1 to W4 despite a control current which is uniformly predetermined by the control transistor T9. The voltage drop produced by the load current at the common emitter resistor R1 controls the second regulating transistor T11. As soon as the voltage drop at the common emitter resistor R1 exceeds the base-emitter threshold, which is approximately 0.7 volt, the second regulating transistor T11 is under control and regulates a portion of the collector current of the third regulating transistor T12, as hereinbefore explained.

The first regulating transistor T10 and, via said first regulating transistor, the control transistor T9 are controlled in accordance with the remaining difference current. If the current is then very high in one of the sequentially controlled component windings W1 to W4, the second regulating transistor T11 is further controlled due to the higher voltage drop at the common emitter resistor R1, so that the current which flows across the collector-emitter path of said second regulating transistor is being increased, which decreases the difference current which flows toward the base electrode of the first regulating transistor T10. As a result, the first regulating transistor T10 and, via said first regulating transistor, the control transistor T9 and, finally, the respective input and power transistors, are somewhat under control, so that the current in the respective component winding decreases accordingly. When the current in a component winding W1 to W4 becomes too low, the regulating process is reversed. As a result, an almost uniform load current flows in the sequentially controlled component windings W1 to W4, despite the different amplification of the input and power transistors.

When the permanent magnet rotor commences to rotate, an electromotive force proportional to the speed of said permanent magnet rotor is produced in the component windings which are not passed by the load current. The strongest positive electromotive force is decoupled from the respective component winding and delivered to the base electrode of the third regulating transistor T12 via the decoupling diode D1 to D4. The cathode of each of the decoupling diodes D1 to D4 is connected via the resistor R21 to the base electrode of the third regulating transistor T12. The anode of each of the decoupling diodes D1 to D4 is connected to a corresponding one of the component windings W1 to W4 at the end of the corresponding component winding which is connected to the power transistor.

The speed-proportional increase of the electromotive force also increases the potential at the base electrode of the third regulating transistor T12, so that said third regulating transistor becomes appropriately controlled. The control of the third regulating transistor T12 decreases the collector current of said third regulating transistor, thereby decreasing the datum value. This also regulates the load current once again, via the first regulating transistor T10, the control transistor T9, the input transistors T5 to T8 and the power transistors T1 to T4. Thus, when the rated speed is attained, the load current is returned via third regulating transistor T12, controlled in dependence upon the speed, and a uniform current load is provided for all the component windings W1 to W4 through the second regulating transistor T11, controlled in dependence upon the actual value.

The third regulating transistor T12 may have applied thereto a voltage proportional to another magnitude, instead of the speed-proportional voltage. A voltage proportional to another magnitude may comprise, for example, a voltage proportional to the travel distance. The DC motor is then regulated according to such magnitude.

In order to be able to protect the DC motor even more effectively against overloading, said motor is automatically deenergized when the maximum datum value lasts too long. The automatic deenergization is effected as follows. The delay capacitor C4 is charged via the other base resistor R18 by the voltage tapped at the voltage divider R19. The delay capacitor C4 is so designed that its voltage exceeds the base-emitter threshold of the delay transistor T14 after a specific period during which the maximum load current persists. The delay transistor T14 thus becomes conductive and draws a collector current via its collector resistor R17 and the terminal resistor R16.

Due to the resulting voltage drop at the terminal resistor R16, the potential at the base electrode of the switching transistor T13, said base electrode being connected to said resistor, becomes negative relative to its emitter potential. The switching transistor T13 short-circuits, via its emitter-collector path, the emitter-base path of the third regulating transistor T12. As a result, the third regulating transistor T12 becomes non-conductive. Thereupon, the first regulating transistor T10 also becomes non-conductive and, in sequence, the control transistor T9, the input transistors T5 to T8 and finally the power transistors T1 to T4 become non-conductive, so that the motor current is switched off. In a rated operation, the value of the voltage tapped at the voltage divider R19 is less than the base-emitter threshold voltage of the delay transistor T14, so that no automatic switch-off of the motor current can occur during rated operation.

Once the motor current has been cut off via the delay transistor T14, this condition remains even after the motor stops, since the base electrode of the delay transistor T14 continues to receive control current via the emitter-collector path of the self-holding transistor T15. As soon as the delay transistor T14 becomes conductive, a control current flows via the tap a of the collector resistor R17 to the base electrode of the self-holding transistor T15. The control current switches the self-holding transistor T15 to its conductive condition. The self-holding transistor T15 thus supplies the control current of the delay transistor T14. The collector current of the delay transistor T14 supplies the control current of the self-holding transistor T15.

In order to make the DC motor operable after automatic deenergization of said motor, a resetting key b is provided. The resetting key b may connect the base electrode of the delay transistor T14 to the negative terminal — of the DC voltage source. This again switches the delay transistor T14, and thus also the switching transistor T13, and the self-holding transistor T15 to their con-conductive condition. The third regulating transistor T12 can therefore again be controlled "upward" through the datum value voltage $U_n$ and the motor can again be accelerated.

The motor current may also be switched off, for example, by a control signal which is released by hand. The control signal is supplied to the control input St, which is connected to the base electrode of the self-holding transistor T15. The control signal switches the self-holding transistor T15 to its conductive condition, so that the delay transistor T14 receives a control current through the emitter-collector path of said self-holding transistor. This also switches the delay transistor T14 to its conductive condition and initiates, in the aforedescribed manner, the switching off of the motor current.

The Zener diode Z1 establishes the emitter potential of the first regulating transistor T10. The Zener voltage of the Zener diode Z1 must be higher than the maximum voltage drop at the common emitter resistor R1, so that the first regulating transistor T10 can be controlled in all industrial instances.

While the invention has been described by means of a specific example and in a specific embodiment, I do not wish to be limited thereto, for obvious modifications will occur to those skilled in the art without departing from the spirit and scope of the invention.

We claim:

1. A brushless DC motor having a permanent magnet rotor and a stator winding comprising a plurality of component windings, a DC voltage source having a first positive terminal and a second negative terminal, a plurality of power transistors each having emitter, collector and base electrodes, one end of each of the component windings being in star connection with the corresponding end of the others of said component windings and being connected to the first terminal of the DC voltage source and the other end of each of said component windings being connected in series with a corresponding one of the power transistors, a common emitter resistor, the emitter electrode of each of the power transistors being connected to the second terminal of the DC voltage source via the common emitter resistor, said brushless DC motor comprising continuously adjustable control means for controlling the power transistors in dependence upon the position of the permanent magnet rotor, said control means comprising a control member having an output coupled to the power transistors and a control input, and current regulating circuit means having an output connected to the input of the control member, said current regulating circuit means having an actual value derived from a current-proportional voltage derived from the common emitter resistor and a datum value determined from outside said current regulating circuit means.

2. A brushless DC motor as claimed in claim 1, wherein the current regulating circuit means includes means for deriving the datum value thereof from the rotary speed of the rotor.

3. A brushless DC motor as claimed in claim 2, wherein the current regulating circuit means includes means for limiting the datum value thereof to a maximum.

4. A brushless DC motor as claimed in claim 3, wherein the current regulating circuit means includes means for switching off the datum value when the maximum thereof lasts longer than a predetermined period of time.

5. A brushless DC motor having a permanent magnet rotor and a stator winding comprising a plurality of component windings, a DC voltage source having a first positive terminal and a second negative terminal, a plurality of power transistor each having emitter, collector and base electrodes, one end of each of the component windings being in star connection with the corresponding end of the others of said component windings and being connected to the first terminal of the DC voltage source and the other end of each of said component windings being connected in series with a corresponding one of the power transistors, a common emitter resistor, the emitter electrode of each of the power transistors being connected to the second terminal of the DC voltage source via the common emitter resistor, said brushless DC motor comprising continuously adjustable control means for controlling the power transistors in dependence upon the position of the permanent magnet rotor, said control means comprising a control member having an output coupled to the power transistors and a control input, the control member comprising a control transistor having emitter, collector and base electrodes, and current regulating circuit means including means for deriving the datum value thereof from the rotary speed of the rotor and means for limiting the datum value thereof to a maximum and having an output connected to the input of the control member, said current regulating circuit means having an actual value derived from a current-proportional voltage derived from the common emitter resistor and a datum value determined from outside said current regulating circuit means, the current regulating circuit means comprising a first collector resistor, a Zener diode, a resistor connected in series with the Zener diode between the first and second terminals of the DC voltage supply, a first regulating transistor having a collector electrode connected to the base electrode of the control transistor and connected to the first terminal of the DC voltage source via the first collector resistor, an emitter electrode connected to a common point in the connection between the Zener diode and the resistor and a base electrode, a base resistor, a first emitter resistor, a second collector resistor, a second regulating transistor having a base electrode directly connected to the base electrode of the first regulating transistor and connected to the common resistor via the base resistor and to the second terminal of the DC voltage source via the first emitter resistor, and emitter and collector electrodes, a second collector resistor, a third regulating transistor having a collector electrode connected to the collector electrode of the second regulating transistor via the second collector resistor, an emitter electrode connected to the first terminal of the DC voltage source and a base electrode, and means for controlling the third regulating transistor in accordance with the rotary speed of the permanent magnet rotor.

6. A brushless DC motor as claimed in claim 5, wherein the third regulating transistor has a base-emitter path and the current regulating circuit means further comprises a terminal resistor, a collector resistor, a switching transistor having emitter and collector electrodes, a base electrode connected to the first terminal of the DC voltage source via the terminal resistor, and an emitter-collector path connected in parallel with the base-emitter path of the third regulating transistor, and a self-holding circuit comprising another base resistor, a voltage divider having one end connected in parallel with the common emitter resistor to the second terminal of the DC voltage source and a tap, a delay capacitor, and a delay transistor having a base electrode connected to the tap of the voltage divider via the other base resistor and connected to the second terminal of the DC voltage source via the delay capacitor, emitter and collector electrodes and an emitter-collector path connected between the second terminal of the DC voltage source and the base electrode of the switching transistor via the collector resistor.

7. A brushless DC motor as claimed in claim 6, wherein the collector resistor is a variable resistor having a tap and the self-holding circuit further comprises a second emitter resistor and a self-holding transistor complementing the delay transistor and having a base electrode connected to the tap of the collector resistor, an emitter electrode connected to the base electrode of the switching transistor via the second emitter resistor and a collector electrode connected to the base electrode of the delay transistor.

8. A brushless DC motor as claimed in claim 7, wherein the self-holding circuit further comprises a control terminal connected to the tap of the collector resistor.

* * * * *